(12) United States Patent
Kim et al.

(10) Patent No.: US 10,769,703 B2
(45) Date of Patent: Sep. 8, 2020

(54) METHOD FOR PROVIDING SERVICE OF PERSONALIZED RECOMMENDATION BASED ON E-MAIL AND APPARATUS THEREFOR

(71) Applicant: SK PLANET CO., LTD., Seongnam-si (KR)

(72) Inventors: Dong-Jin Kim, Seoul (KR); Yong-Bum Lee, Seoul (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 229 days.

(21) Appl. No.: 16/034,748

(22) Filed: Jul. 13, 2018

(65) Prior Publication Data

US 2019/0019236 A1 Jan. 17, 2019

(30) Foreign Application Priority Data

Jul. 13, 2017 (KR) .......................... 10-2017-0088947

(51) Int. Cl.
*G06Q 30/00* (2012.01)
*G06Q 30/06* (2012.01)
*H04L 12/58* (2006.01)

(52) U.S. Cl.
CPC ..... *G06Q 30/0631* (2013.01); *G06Q 30/0643* (2013.01); *H04L 51/046* (2013.01); *H04L 51/10* (2013.01); *H04L 51/18* (2013.01)

(58) Field of Classification Search
None
See application file for complete search history.

(56) References Cited

U.S. PATENT DOCUMENTS

| 2011/0282821 | A1* | 11/2011 | Levy | G06Q 30/0631 706/47 |
| 2012/0316986 | A1* | 12/2012 | Levy | G06Q 30/0631 705/26.7 |
| 2013/0110950 | A1* | 5/2013 | Martine | G06Q 30/02 709/206 |
| 2017/0103447 | A1* | 4/2017 | Brandenberg | G06Q 30/0631 |

FOREIGN PATENT DOCUMENTS

| JP | 2004-504670 A | 2/2004 |
| KR | 10-2011-0062063 | 6/2011 |
| KR | 10-2017-0043259 | 4/2017 |
| WO | WO 2002/006983 A2 | 1/2002 |

* cited by examiner

*Primary Examiner* — Mila Airapetian
(74) *Attorney, Agent, or Firm* — Fenwick & West LLP

(57) ABSTRACT

Disclosed herein are a method for providing a personalized recommendation service based on email and an apparatus for the same. The personalized recommendation service may be provided by determining a personalized recommended item targeted at a recommendation target user, creating dynamic image output code for outputting the personalized recommended item, creating an email based on the dynamic image output code and sending the email to the recommendation target user, and calling the most recent item information about the personalized recommended item from a marketing server based on execution of the dynamic image output code when the recommendation target user reads the email. Also, when a user reads an email, the most recent information about items that are being provided in the marketing server may be provided.

10 Claims, 10 Drawing Sheets

METHOD FOR PROVIDING SERVICE OF PERSONALIZED RECOMMENDATION BASED ON E-MAIL AND APPARATUS THEREFOR

CROSS REFERENCE TO RELATED APPLICATION

This application claims the benefit of Korean Patent Application No. 10-2017-0088947, filed Jul. 13, 2017, which is hereby incorporated by reference in its entirety into this application.

BACKGROUND OF THE INVENTION

1. Technical Field

The present invention relates generally to technology for providing personalized recommendation service using emails, and more particularly to technology for providing personalized recommended items always using the most recent information by creating dynamic content from item information registered in a marketing server and providing the same when a customer reads an email.

2. Description of the Related Art

Email marketing is a conventional mass-marketing channel for multiple users online. Here, emails to be sent for each campaign have the same content. That is, emails having the same content are sent to all users who have agreed to receive email marketing. However, such a marketing method shows the same items to all users without considering the personal taste of each user, and the users are forced to view items in which they are not interested. For example, diaper items may be shown to a middle-aged man who is not interested therein, or car accessories or products for managing a blood sugar level may be shown to a teenage student.

Such uniform marketing content may not meet the increasingly diverse demands of users. Accordingly, the sales rate of a marketing site or an online shopping mall, which must encourage a user to click on and buy an item, may be decreased, and users forced to view unwanted items do not read marketing emails sent from the marketing site or the online shopping mall any longer, whereby marketing performance may decrease.

As a solution to these problems, personalization is attempted in email marketing by including a user's name in the subject or content of an email or by sending emails having different content to respective groups divided based on interests, age, sex, and similar characteristics of users. However, this method is not effective in email marketing because the degree of personalization is not as sophisticated as in personalized recommendation email marketing, in which different content is dynamically created for individuals. In connection with this, Korean Patent Application Publication No. 10-2017-0043259 discloses a technology related to "Real-time marketing system automated based on visitor's behavior in web page".

SUMMARY OF THE INVENTION

An object of the present invention is to provide a personalized recommendation service for each user using email marketing, thereby increasing a click-through rate or conversion rate related to the personalized recommendation service.

Another object of the present invention is to provide the most recent information about an item that is being provided from a marketing server when a user reads an email.

A further object of the present invention is to automatically create and send a personalized recommendation email using a server, thereby improving the efficiency and convenience of email marketing.

In order to accomplish the above objects, a method for providing a personalized recommendation service according to the present invention includes determining a personalized recommended item targeted at a recommendation target user and creating dynamic image output code for outputting the personalized recommended item; creating an email for providing a personalized recommendation service based on the dynamic image output code and sending the email to the recommendation target user; and providing the personalized recommendation service by calling most recent item information about the personalized recommended item from a marketing server based on execution of the dynamic image output code when the recommendation target user reads the email.

Here, the dynamic image output code may be contained in an <img> tag, among Hypertext Markup Language (HTML) tags, and may include a trigger for calling an Application Program Interface (API) for creating a dynamic image corresponding to the personalized recommended item based on an item code of the personalized recommended item.

Here, providing the personalized recommendation service may include, based on an operation of the trigger for calling the API, acquiring the item information about an item linked with the item code, among multiple items registered in the marketing server; and creating the dynamic image by converting the item information to a format of a template corresponding to the personalized recommendation service.

Here, providing the personalized recommendation service may be configured to create dynamic content corresponding to the personalized recommendation service by applying the dynamic image to the template, and to output the dynamic content to the recommendation target user through the email.

Here, the method may further include acquiring a recommendation target list to be provided with the personalized recommendation service based on a database of the marketing server; and providing the personalized recommendation service by creating the dynamic image output code for each of multiple recommendation target users included in the recommendation target list.

Here, the recommendation target list may include a user whose level, which is set based on at least one of an activity of buying items on the marketing server and a rate of reading emails, is equal to or higher than a preset reference level, among multiple users registered in the database.

Here, the method may further include extracting multiple personalized recommended items for the recommendation target user in consideration of a preset number of items to be exposed in the template; and matching an item code of each of the multiple personalized recommended items with a user ID of the recommendation target user.

Here, extracting the multiple personalized recommended items may be configured such that a greater number of personalized recommended items than the preset number of items to be exposed are extracted in preparation for a case in which the personalized recommended item is out of stock.

Also, a server according to the present invention includes memory for determining a personalized recommended item targeted at a recommendation target user and storing dynamic image output code that is created in order to output the personalized recommended item; and a processor for creating an email for providing a personalized recommendation service based on the dynamic image output code, sending the email to the recommendation target user, calling most recent item information about the personalized recommended item from a marketing server based on execution of the dynamic image output code when the recommendation target user reads the email, and thereby providing the personalized recommendation service.

Here, the dynamic image output code may be contained in an <img> tag, among Hypertext Markup Language (HTML) tags, and may include a trigger for calling an Application Program Interface (API) for creating a dynamic image corresponding to the personalized recommended item based on an item code of the personalized recommended item.

Here, the processor may acquire the item information about an item linked with the item code, among multiple items registered in the marketing server, based on an operation of the trigger for calling the API, and may create the dynamic image by converting the item information to a format of a template corresponding to the personalized recommendation service.

Here, the processor may create dynamic content corresponding to the personalized recommendation service by applying the dynamic image to the template, and may output the dynamic content to the recommendation target user through the email.

Here, the processor may acquire a recommendation target list to be provided with the personalized recommendation service based on a database of the marketing server, and may provide the personalized recommendation service by creating the dynamic image output code for each of multiple recommendation target users included in the recommendation target list.

Here, the recommendation target list may include a user whose level, which is set based on at least one of an activity of buying items on the marketing server and a rate of reading emails, is equal to or higher than a preset reference level, among multiple users registered in the database.

Here, the processor may extract multiple personalized recommended items for the recommendation target user in consideration of a preset number of items to be exposed in the template, and may match an item code of each of the multiple personalized recommended items with a user ID of the recommendation target user.

Here, the processor may extract a greater number of personalized recommended items than the preset number of items to be exposed in preparation for a case in which the personalized recommended item is out of stock.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
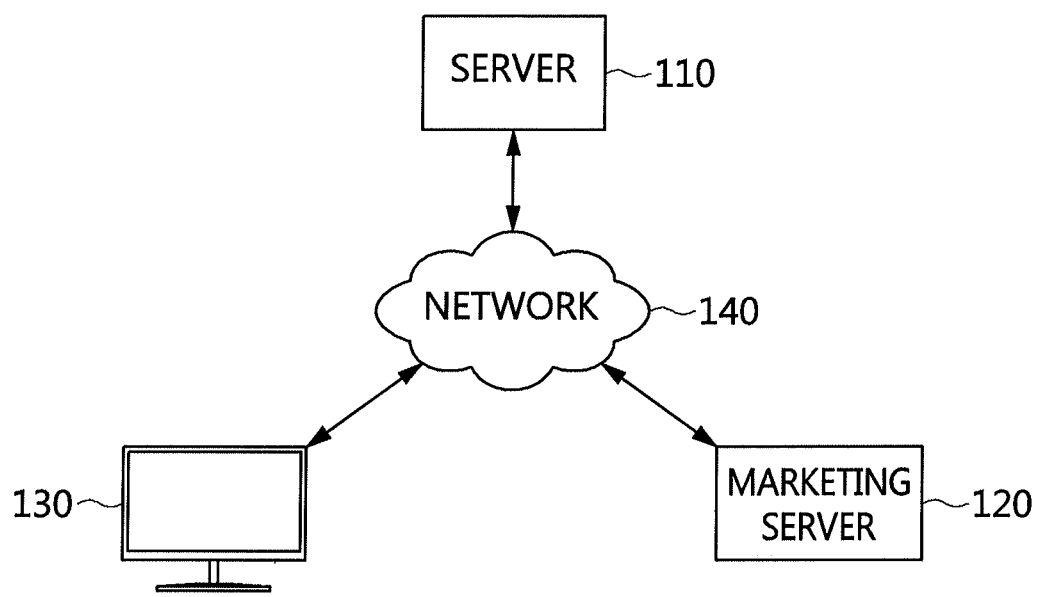
FIG. 1 is a view that shows a system for providing a personalized recommendation service based on email according to an embodiment of the present invention.

Technical terms used in this specification are used to describe only specific embodiments, and it is to be noted that the terms are not intended to limit the present invention. Furthermore, the technical terms used in this specification should be interpreted as having meanings that are commonly understood by a person having ordinary skill in the art to which the present invention pertains, unless specifically defined in this specification, and should not be interpreted as having excessively comprehensive meanings or excessively narrow meanings. Furthermore, if the technical terms used in this specification are erroneous technical terms that do not accurately represent the spirit of the present invention, they should be replaced with technical terms that may be correctly understood by a person having ordinary skill in the art. Furthermore, common terms used in the present invention should be interpreted in accordance with the definitions of dictionaries or in accordance with the context, and should not be interpreted as having excessively narrow meanings.

Furthermore, an expression of the singular number used in this specification includes an expression of the plural number unless clearly defined otherwise by the context. In this application, terms such as "comprise" and "include" should not be interpreted as essentially including all of several elements or several steps described in the specification, but should be broadly interpreted as potentially not including some of the elements or steps or including additional element or steps.

Furthermore, terms including ordinal numbers, such as "first" and "second" in this specification, may be used to describe a variety of elements, but the elements should not be limited to the terms. The terms are used to only distinguish one element from another element. For example, a first element may be named a second element, and likewise a second element may be named a first element without departing from the scope of the present invention.

Hereinafter, preferred embodiments in accordance with the present invention are described in detail with reference to the accompanying drawings. The same or similar elements are assigned the same reference numerals irrespective of reference numerals, and a redundant description thereof is omitted.

In the following description of the present invention, detailed descriptions of known functions and configurations which are deemed to make the gist of the present invention obscure will be omitted. The accompanying drawings of the present invention aim to facilitate understanding of the present invention and should not be construed as being limited to the accompanying drawings.

FIG. 1 is a view that shows a system for providing a personalized recommendation service based on email according to an embodiment of the present invention.

Referring to FIG. 1, the system for providing a personalized recommendation service based on email according to an embodiment of the present invention includes a server 110, a marketing server 120, a user terminal 130, and a network 140.

The server 110 according to an embodiment of the present invention may be a device for providing an email related to a personalized recommendation service to the user terminal 130 using item information registered in the marketing server 120 based on the network 140. That is, the server 110 may acquire information about multiple users and multiple items registered in the marketing server 120 based on the network 140, create an email including information about personalized recommended items using the acquired information, and send the email to the user terminal 130. Here, the user terminal 130 that received the email may obtain the most recent dynamic content information based on the personalized recommendation service included in the email, and may buy the corresponding item by accessing a marketing site through the dynamic content information.

Here, FIG. 1 illustrates the server 110 and the marketing server 120 as being separate from each other, but the server 110 and the marketing server 120 may be included in a single device depending on the circumstances. That is, the server 110 for providing a personalized recommendation service by sending an email to the user terminal 130 may be included in the marketing server 120 for providing an online shopping service. Conversely, the marketing server 120 for providing an online shopping service may be included in the server 110 for providing a personalized recommendation service by sending an email to the user terminal 130.

The server 110 calculates a personalized recommended item targeted at a recommendation target user and creates dynamic image output code for outputting the personalized recommended item.

Here, the dynamic image output code is contained in the <img> tag, among Hypertext Markup Language (HTML) tags. The dynamic image output code may include a trigger for calling an Application Program Interface (API) for creating a dynamic image corresponding to the personalized recommended item based on the item code of the personalized recommended item.

Also, the server 110 creates an email for providing a personalized recommendation service based on the dynamic image output code and sends the email to the recommendation target user.

Also, when the recommendation target user reads the email, the server 110 calls the most recent item information about the personalized recommended item from the marketing server based on the execution of the dynamic image output code, thereby providing a personalized recommendation service.

Here, based on the operation of the trigger for calling the API, the information about the item linked with the item code may be acquired, among multiple items registered in the marketing server.

Here, the item information may be converted into the format of a template corresponding to the personalized recommendation service, whereby a dynamic image may be created.

Here, dynamic content for the personalized recommendation service is created by applying the dynamic image to the template, and the dynamic content may be shown to the recommendation target user using the email.

Also, the server 110 acquires a recommendation target list to be provided with the personalized recommendation service based on the database of the marketing server 120.

Here, the recommendation target list may include a user whose level, which is set based on at least one of the activity of buying items on the marketing server and the activity of reading emails, is equal to or higher than a preset reference level, among the multiple users registered in the database.

Here, dynamic image output code is created for each of the multiple users included in the recommendation target list, whereby the personalized recommendation service may be provided.

Also, the server 110 extracts multiple personalized recommended items for the recommendation target user in consideration of the preset number of items to be exposed in the template.

Here, preparing for the case in which a personalized recommended item is out of stock, a greater number of personalized recommended items than the preset number of items to be exposed may be extracted.

Here, the item code of each of the multiple personalized recommended items may be matched with the user ID of the recommendation target user.

The marketing server 120 may be a device for providing an online shopping service or an online marketing service for enabling a user to buy items online based on the user terminal 130. That is, the shopping site or the marketing site accessed by users may be managed and maintained through the marketing server 120.

Here, the marketing server 120 may store and manage user information about users who use an online shopping service and item information about multiple items registered in a marketing site using a separate database.

The user terminal 130 may receive an email including a personalized recommendation service from the server 110. Here, the user may access the marketing server 120 using the user terminal 130 and shop online or buy a recommended item based on the personalized recommendation service included in the email.

Also, the user terminal 130 is a device that enables reading an email according to the present invention through connection with a communication network, and may be any of various types of terminals including all types of information communication devices, multimedia terminals, Internal Protocol (IP) terminals, and the like, without being limited to mobile communication terminals. Also, the user terminal 130 may be a mobile terminal having various mobile communication specifications, such as a mobile phone, a Portable Multimedia Player (PMP), a Mobile Internet Device (MID), a smartphone, a tablet PC, a laptop, a netbook, a Personal Digital Assistant (PDA), an information communication device, and the like.

Also, the user terminal 130 may receive various kinds of information, such as numbers, letters, and the like, and may deliver signals, which are input for setting various functions and controlling the functions of the user terminal 130, to the control unit via the input unit. Also, the input unit of the user terminal 130 may be configured so as to include at least one of a keypad and a touch pad, which generate an input signal in response to the touch or manipulation by a user. Here, the input unit of the user terminal 130 and the display unit thereof may form a single touch panel (or a touch screen), thereby performing both an input function and a display function. Also, the input unit of the user terminal 130 may use all types of input means that may be developed in the future as well as currently existing input devices, such as a keyboard, a keypad, a mouse, a joystick, and the like.

Also, the display unit of the user terminal 130 may display information about a series of operation states and operation results generated while the function of the user terminal is being performed. Also, the display unit of the user terminal 130 may display the menu of the user terminal and user data input by a user. Here, the display unit of the user terminal 130 may be configured as a Liquid Crystal Display (LCD), a Thin Film Transistor LCD (TFT-LCD), a Light-Emitting Diode (LED), an Organic LED (OLED), an Active Matrix OLED (AMOLED), a retina display, a flexible display, a 3-dimensional display, or the like. Here, when the display unit of the user terminal 130 is configured in the form of a touch screen, the display unit of the user terminal 130 may perform some or all of the functions of the input unit of the user terminal 130. Particularly, the display unit of the user terminal 130 according to the present invention may display an interface provided for the purchase of a personalized recommended item and information about execution of the application on a screen.

Also, the storage unit of the user terminal 130 may include a main storage device and an auxiliary storage device as devices for storing data, and may store applications that are necessary for the operation of the user terminal 130. The storage unit of the user terminal 130 may include a program area and a data area. Here, when the user terminal 130 activates each function in response to a request from a user, the user terminal 130 provides the function by running corresponding applications under the control of the control unit. Particularly, the storage unit of the user terminal 130 according to the present invention may store an Operating System (OS) for booting the user terminal 130, an application for sending and receiving information input for buying a personalized recommended item, and the like. Also, the storage unit of the user terminal 130 may store information about the user terminal 130 and a content DB for storing multiple pieces of content. Here, the content DB may include execution data for executing content and attribute information about the content, and may store content usage information in response to the execution of the content. Also, the information about the user terminal 130 may include the specifications of the user terminal 130.

Also, the communication unit of the user terminal 130 may function to send and receive data to and from the server 110 or the marketing server 120 over the network 140. Here, the communication unit of the user terminal 130 may include an RF transmission medium for up-conversion and amplification of the frequency of a sending signal and an RF reception medium for low-noise amplification of a receiving signal and down-conversion of the frequency thereof. Such a communication unit of the user terminal 130 may include a wireless communication module. Also, the wireless communication module is a component for sending or receiving data based on a wireless communication method, and may send and receive data to and from the server 110 or the marketing server 120 using any one of a wireless network communication module, a wireless LAN communication module, and a wireless PAN communication module when the user terminal 130 uses wireless communication. That is, the user terminal 130 may access the network 140 using a wireless communication module, and may send and receive data to and from the server 110 or the marketing server 120 over the network 140. Particularly, the network 140 according to the present invention may send and receive data that are necessary for the purchase of a personalized recommended item by communicating with the server 110, the marketing server 120, or the user terminal 130.

Also, the control unit of the user terminal 130 may be a processing device for running an Operating System (OS) and respective components. For example, the control unit may control the overall process of accessing the server 110 or the marketing server 120. When access to the server 110 or the marketing server 120 is made through an application, the control unit may control the overall process of running the application in response to the request by a user, and may perform control so as to send a request for using a service to the server 110 or the marketing server 120 simultaneously with execution of the application. Here, the control unit may perform control such that information about the user terminal required for user authentication is sent along with the request.

The network 140 may provide a channel via which the server 110, the marketing server 120, and the user terminal 130 deliver data therebetween, and may be conceptually understood as including networks that are currently being used and networks that have yet to be developed. For example, the network may be any one of wired and wireless local networks for providing communication between various kinds of data devices in a limited area, a mobile communication network for providing communication between mobile devices or between a mobile device and the outside thereof, a satellite network for providing communication between earth stations using a satellite, and a wired and wireless communication network, or may be a combination of two or more selected therefrom. Meanwhile, a transmission protocol standard for the network is not limited to existing transmission protocol standards, but may include all transmission protocol standards to be developed in the future.

Figure 2:
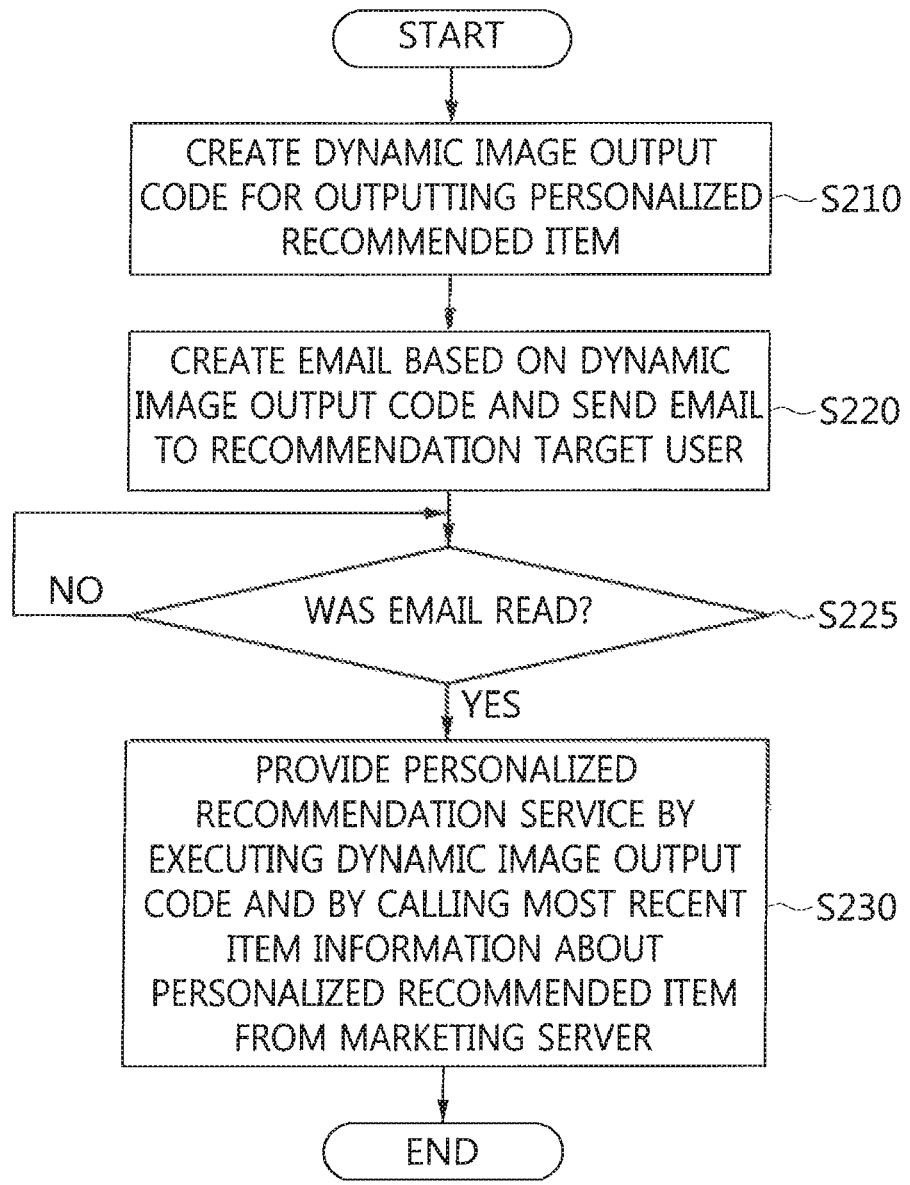
FIG. 2 is a flowchart that shows a method for providing a personalized recommendation service according to an embodiment of the present invention.

FIG. 2 is a flowchart that shows a method for providing a personalized recommendation service according to an embodiment of the present invention.

Referring to FIG. 2, in the method for providing a personalized recommendation service according to an embodiment of the present invention, a personalized recommended item targeted at a recommendation target user is determined, and dynamic image output code for outputting the personalized recommended item is created at step S210.

Here, the personalized recommended item targeted at the recommendation target user is an item that is recommended in consideration of the shopping or purchase pattern of the recommendation target user or the pattern of use of a marketing site, and may be an item that is more likely to be bought than general items. Recently, items have come to be recommended to individual users using marketing based on personalized recommendations, whereby the volume of transactions in the online shopping markets continues to increase.

Accordingly, the present invention also provides a recommendation target user with recommended items based on such personalized recommendation, but may create dynamic image output code in order to output information about the personalized recommended item through a marketing email.

Here, the dynamic image output code may be code for outputting a dynamic image for the personalized recommended item targeted at the recommendation target user. For example, when the dynamic image output code is used, various kinds of information, such as an image of the personalized recommended item, the name thereof, the price thereof, discount information, options, and the like, may be configured in the form of a dynamic image and output to an email.

Generally, in order to display dynamic content on the web, a language such as JavaScript, HTML5 or the like must be used. However, because JavaScript is vulnerable to security issues, there is concern about propagation of malware, such as computer viruses or ransomware. Therefore, most email hosting providers ban the use of JavaScript in email content. Also, HTML5 is a next-generation web standard language, which may show dynamic content without installation of a special plugin or application, but still has features that are not fully compatible with all browsers, so it is not adequate to display email content.

Accordingly, existing email marketing systems send emails containing static information. Here, when item information is changed due to the circumstances of the seller, a shopping mall, or a marketing site, a new email corresponding to the changed information must be sent again, which is inconvenient. However, in order to sell more items in the online shopping market, sellers may frequently change item information. Therefore, it is difficult to always provide the most recent information to users who receive the email.

Also, because the number of items that can be displayed in a marketing email is limited, the period during which item information included in the marketing email is maintained is set under the agreement between a shopping mall manager and an item seller. Accordingly, even if information about the actual item is changed during the set period, changing the item information included in the marketing email is not allowed for user convenience.

However, in the case of email marketing using a personalized recommendation service according to the present invention, any item matching user's behavior patterns and preferences may be recommended by being displayed in an email. Therefore, any items registered in a marketing site or an online shopping mall may be selected as items to be recommended. For example, "11st", which is the biggest online open market in Korea, has more than eighty million items registered therein, and it is virtually impossible to maintain item information displayed in an email.

Therefore, in order to dynamically display the most recent item information in an email, the present invention uses HTML tags and dynamic image output code based on an API for providing imaged item information.

The dynamic image output code will be described in detail at step S230.

Also, in the method for providing a personalized recommendation service according to an embodiment of the present invention, an email for providing a personalized recommendation service is created based on the dynamic image output code, and is sent to the recommendation target user at step S220.

Here, an email may be created by applying the dynamic image output code to the template of the email, which is the template of the personalized recommendation service that enables personalized recommended items to be arranged in the same layout.

Here, the email may be sent based on the server according to an embodiment of the present invention or using a separate email-sending server.

Also, in the method for providing a personalized recommendation service according to an embodiment of the present invention, whether the recommendation target user reads the email is checked at step S215. When the recommendation target user reads the email, the personalized recommendation service is provided at step S230 by calling the most recent item information about the personalized recommended item from the marketing server based on the execution of the dynamic image output code.

Also, when it is determined at step S215 that the recommendation target user does not read the email, a standby state may be maintained until the recommendation target user reads the email.

Here, the dynamic image output code is contained in the <img> tag, among HTML tags, and may include a trigger for calling an API for creating a dynamic image for the personalized recommended item based on the item code of the personalized recommended item.

Generally, in order to display an image on the web, the HTML <img> tag is used. Here, the image path written in the <img> tag is mostly a static file path, in which case it is problematic in that dynamic content may not be represented with the <img> tag. Accordingly, the present invention includes a trigger for calling an API in the image path, whereby a dynamic image related to the personalized recommended item may be output.

Here, the trigger for calling an API may be the URL of the API for outputting dynamic information about the personalized recommended item. That is, the HTML <img> tag is used to represent information about an item in the email, but the URL of the API is used as the URL of the image source, instead of a static image file path, whereby a dynamic image may be displayed using the API.

For example, the code for calling a dynamic image item may be created as follows:

```
<a href="item_detail_page_URL">
<img src =
"http://www.11st.co.kr/commons/ProductApiAction.tmall?method=getProductImage&prod
uctCode=1116201797"></br>
<img src =
"http://www.11st.co.kr/commons/ProductApiAction.tmall?method=getProductNameNCost
&productCode=1116201797">
</a>
```

In the above code, the image source (src) written in the <img> tag is not a static file path, but a method of calling an API having the item code (1116201797) as the argument thereof. That is, according to the above <img> tag, the dynamic image corresponding to the item code may be requested and acquired from an API server based on the Uniform Resource Locator (URL) included in the <img src=""> tag.

Here, the API server may be a server for transmitting a dynamic image corresponding to the personalized recommended item according to an embodiment of the present invention.

Here, based on the operation of the API-calling trigger, item information about the item mapped to the item code, among multiple items registered in the marketing server, may be acquired.

For example, when the dynamic image for the item code is requested from the API server through the operation of the API-calling trigger, the server according to an embodiment of the present invention, which operates in conjunction with the API server, may acquire item information about the personalized recommended item mapped to the item code. Therefore, the API server may operate in conjunction with the server according to an embodiment of the present invention.

Here, the item information is converted into the format of a template corresponding to the personalized recommendation service, that is, the template output via an email, whereby a dynamic image may be created.

Here, using the item information, an item image only for the use of email marketing and text information about the personalized recommended item are combined and converted into an image, whereby a dynamic image may be created.

Here, when the personalized recommendation service is provided using HTML tags, as in the present invention, it is difficult to provide text as dynamic information. Therefore, item information stored in a text format, such as an item name, a price, and the like, may be converted into an image and then be provided as a dynamic image.

Also, a dynamic image may be created in advance before the dynamic image output code is executed. That is, when a personalized recommended item is targeted at the recommendation target user, a dynamic image is created and mapped to the item code of the personalized recommended item. Then, the created dynamic image may be provided when the dynamic image is requested through the execution of the dynamic image output code.

Here, a dynamic image may be created in advance before it is provided. That is, considering the performance of the system for providing a personalized recommendation service, a dynamic image for an item is created when the item is newly registered in an item DB or when the item is updated in order to prevent loading latency when a recommendation target user reads an email.

Here, dynamic content for the personalized recommendation service is created by applying the dynamic image to the template of the personalized recommendation service, that is, the template output via the email, and then the dynamic content may be shown to the recommendation target user using the email.

Here, the dynamic content, in which the dynamic image is applied to the template, may be the content that is finally shown to the recommendation target user. That is, the dynamic content may be recommendation information created by incorporating the most recent information about the personalized recommended item therein based on the dynamic image.

Also, although not illustrated in FIG. 2, in the method for providing a personalized recommendation service according to an embodiment of the present invention, a recommendation target list to be provided with the personalized recommendation service may be acquired based on the database of the marketing server.

Here, email marketing using the personalized recommendation service according to an embodiment of the present invention may be managed for each campaign. Accordingly, recommendation target users to be provided with the personalized recommendation service may be extracted depending on a certain campaign.

Here, the recommendation target users may be selected from users registered in the marketing server that provides the personalized recommendation service. Therefore, the recommendation target list may be created based on user information or member information stored in the database of the marketing server.

Here, the recommendation target list may include a user whose level, which is set based on at least one of the behavior of buying items on the marketing server and the rate of reading emails, is equal to or higher than a preset reference level, among the multiple users registered in the database of the marketing server. That is, users who actively buy items on the marketing server or users who often read marketing emails based on a personalized recommendation service may be included in the recommendation target list.

For example, it may be assumed that the users registered in the marketing server are classified into five levels from first to fifth levels, and that users who have made more purchases or who use the service more frequently are classified as preferred customers, corresponding to the first level. Here, if the personalized recommendation service is provided only to users corresponding to the first level or the second level, users whose level is the first level or the second level, among all of the users registered in the marketing server, are retrieved, whereby a recommendation target list including the retrieved users may be created.

Here, the recommendation target list is created in the marketing server and then provided to the server according to an embodiment of the present invention, or may be created in the server that received user information from the marketing server.

Here, dynamic image output code is created for each of the multiple recommendation target users included in the recommendation target list, whereby the personalized recommendation service may be provided.

Here, the emails to be sent to the multiple recommendation target users may be based on the same template, but information about a personalized recommended item included in the template may differ depending on the user.

Also, although not illustrated in FIG. 2, in the method for providing a personalized recommendation service according to an embodiment of the present invention, multiple personalized recommended items for the recommendation target user may be extracted in consideration of the preset number of items to be exposed in the template of the personalized recommendation service.

Here, the multiple personalized recommended items may be extracted for each user in consideration of the shopping pattern, the purchase pattern, the personal preference, and the like of the recommendation target user, and may be extracted based on the items that are registered in the marketing server and stored in the database.

Here, the preset number of items to be exposed may be the number of personalized recommended items that can be included in the template of the personalized recommendation service. That is, the preset number of items to be exposed is the number of items to be shown to the recommendation target user through the email.

Here, the number of items to be exposed may be set and changed by the personalized recommendation service provider according to an embodiment of the present invention, but may be set so as to correspond to the number of items that can be contained in the template.

Here, in preparation for the case where the personalized recommended items are out of stock, a greater number of personalized recommended items than the preset number of items to be exposed may be extracted.

For example, it may be assumed that ten personalized recommended items are extracted because the preset number of items to be exposed is ten, and that the personalized recommendation service is provided based on the extracted items. Here, if any of the ten personalized recommended items is out of stock, another personalized recommended item for replacing the out-of-stock item may be required. Therefore, a number of personalized recommended items that is two or three items greater than the preset number of items to be exposed are extracted, and when it is necessary to replace an item with another one, one of the remaining personalized recommended items replaces the item, whereby the personalized recommendation service may be provided.

Here, the item code of each of the multiple personalized recommended items may be matched with the user id of the recommendation target user.

Here, the user id of the recommendation target user may be acquired based on the user information stored in the database of the marketing server.

Also, although not illustrated in FIG. 2, in the method for providing a personalized recommendation service according to an embodiment of the present invention, when item information registered in the database of the marketing server is changed, a dynamic image for the personalized recommendation service may be updated based thereon.

For example, it may be assumed that item information about item A registered in the database of the marketing server is changed. Here, if there is a recommendation target user whose personalized recommended item is the item A, the most recent information about the item A must be provided as the personalized recommendation service. Accordingly, a dynamic image is created by combining and converting the item information about the item A, and the created dynamic image may be mapped to the item code of the item A.

In another example, it may be assumed that a new item B is registered in the database of the marketing server. Here, because the item B may be provided as a personalized recommended item to the recommendation target user whose personalized recommended items are similar to the item B, a dynamic image for the item B is created, and the dynamic image may be mapped to the item code of the item B in advance.

Also, although not illustrated in FIG. 2, in the method for providing a personalized recommendation service according to an embodiment of the present invention, when a user clicks on the personalized recommended item shown in the email, a detail page about the personalized recommended item may be provided in order to increase sales of the corresponding item.

Also, although not illustrated in FIG. 2, in the method for providing a personalized recommendation service according to an embodiment of the present invention, a general marketing email may be sent to general users who are not included in the recommendation target list.

Here, the general marketing email uses the same template as the email of the personalized recommendation service according to an embodiment of the present invention, but a general recommended item may be applied to the template, rather than applying a personalized recommended item.

Also, although not illustrated in FIG. 2, in the method for providing a personalized recommendation service according to an embodiment of the present invention, various kinds of information generated during the above-described process of providing a personalized recommendation service may be stored in a separate storage module.

Through the above-described method for providing a personalized recommendation service, a recommendation service personalized for each user is provided using email marketing, whereby a click-through rate or conversion rate related to the personalized recommendation service may be increased.

Also, when a user reads an email, the most recent information about the item that is being provided in the marketing server may be provided.

Also, a personalized recommendation email is automatically created and sent, whereby the efficiency and convenience of email marketing may be improved.

Figure 3:
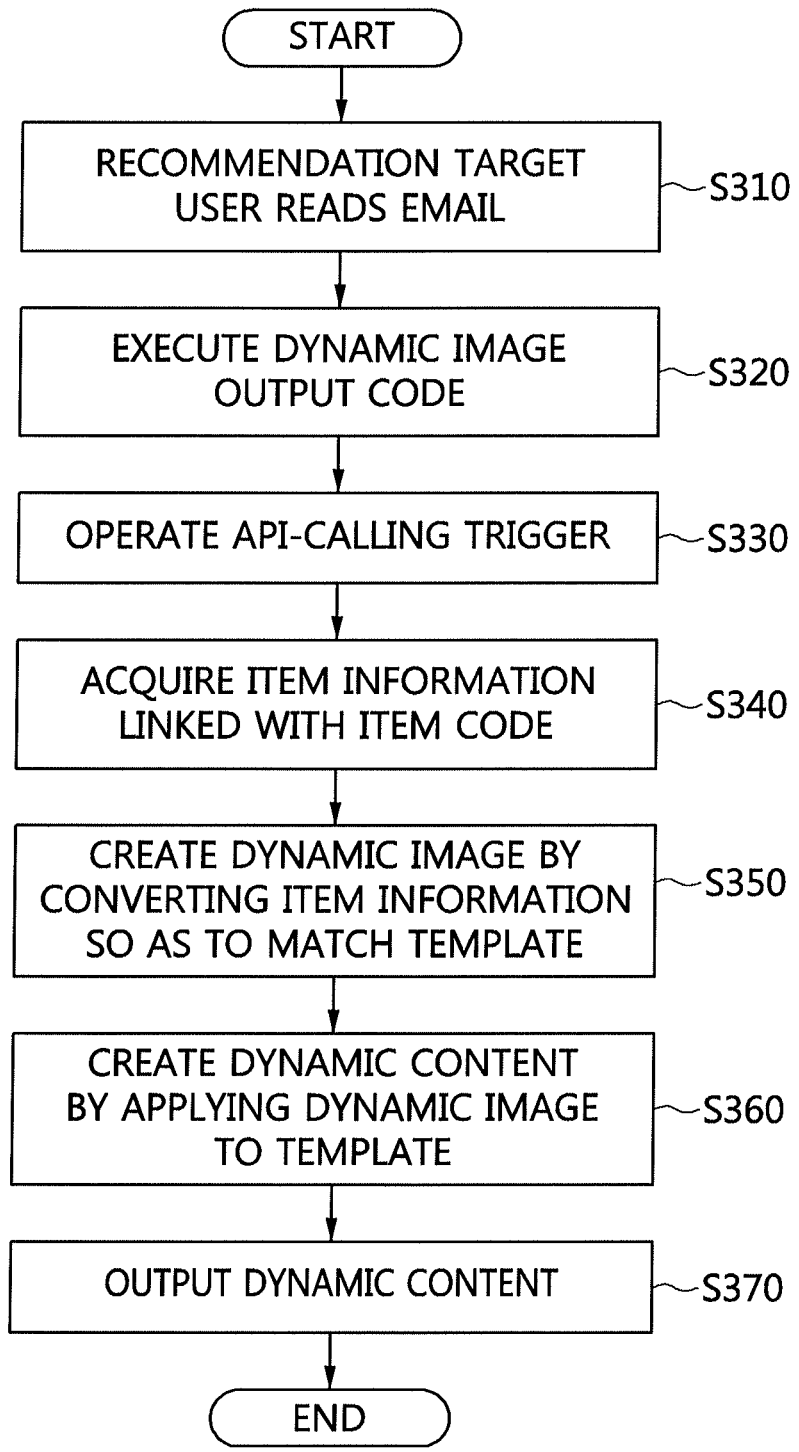
FIG. 3 is a flowchart that shows an example of the process of outputting dynamic content using a dynamic image item code in the method for providing a personalized recommendation service according to the present invention.

FIG. 3 is a flowchart that shows an example of the process of outputting dynamic content using a dynamic image item code in the method for providing a personalized recommendation service according to the present invention.

Referring to FIG. 3, in the process of outputting dynamic content using a dynamic image item code in the method for providing a personalized recommendation service according to the present invention, when a recommendation target user reads an email, which is sent so as to correspond to a personalized recommendation service, at step S310, the dynamic image output code included in the email is executed at step S320, and a trigger for calling an API may operate at step S330.

Here, the dynamic image output code is contained in the <img> tag, among HTML tags, and may include a trigger for calling an API for creating a dynamic image for a personalized recommended item based on the item code of the personalized recommended item.

Here, the trigger for calling an API may be the URL of the API for outputting dynamic information about the personalized recommended item. That is, the HTML <img> tag is used to represent information about an item in the email, but the URL of the API is used as the URL of the image source, instead of a static image file path, whereby the dynamic image may be displayed using the API.

Then, item information linked with the item code is acquired at step S340 through the operation of the API-calling trigger, and the item information is converted so as to match the template displayed in the email, or is combined with the template, whereby a dynamic image may be created at step S350.

Here, using the item information, an item image only for the use of email marketing and text information about the personalized recommended item are combined and converted into an image, whereby a dynamic image may be created.

Here, when the personalized recommendation service is provided using HTML tags, as in the present invention, it is difficult to provide text as dynamic information. Therefore, item information stored in a text format, such as an item name, a price, and the like, is converted into an image, whereby such information may be provided as a dynamic image.

Then, dynamic content may be created at step S360 by applying the dynamic image, provided from the API server, to the template, and the personalized recommended item may be recommended to the recommendation target user at step S370 by displaying the dynamic content.

Here, the dynamic content, in which the dynamic image is applied to the template, may be the content that is finally shown to the recommendation target user. That is, the dynamic content may be recommendation information created by incorporating the most recent information about the personalized recommended item therein based on the dynamic image.

Figure 4:
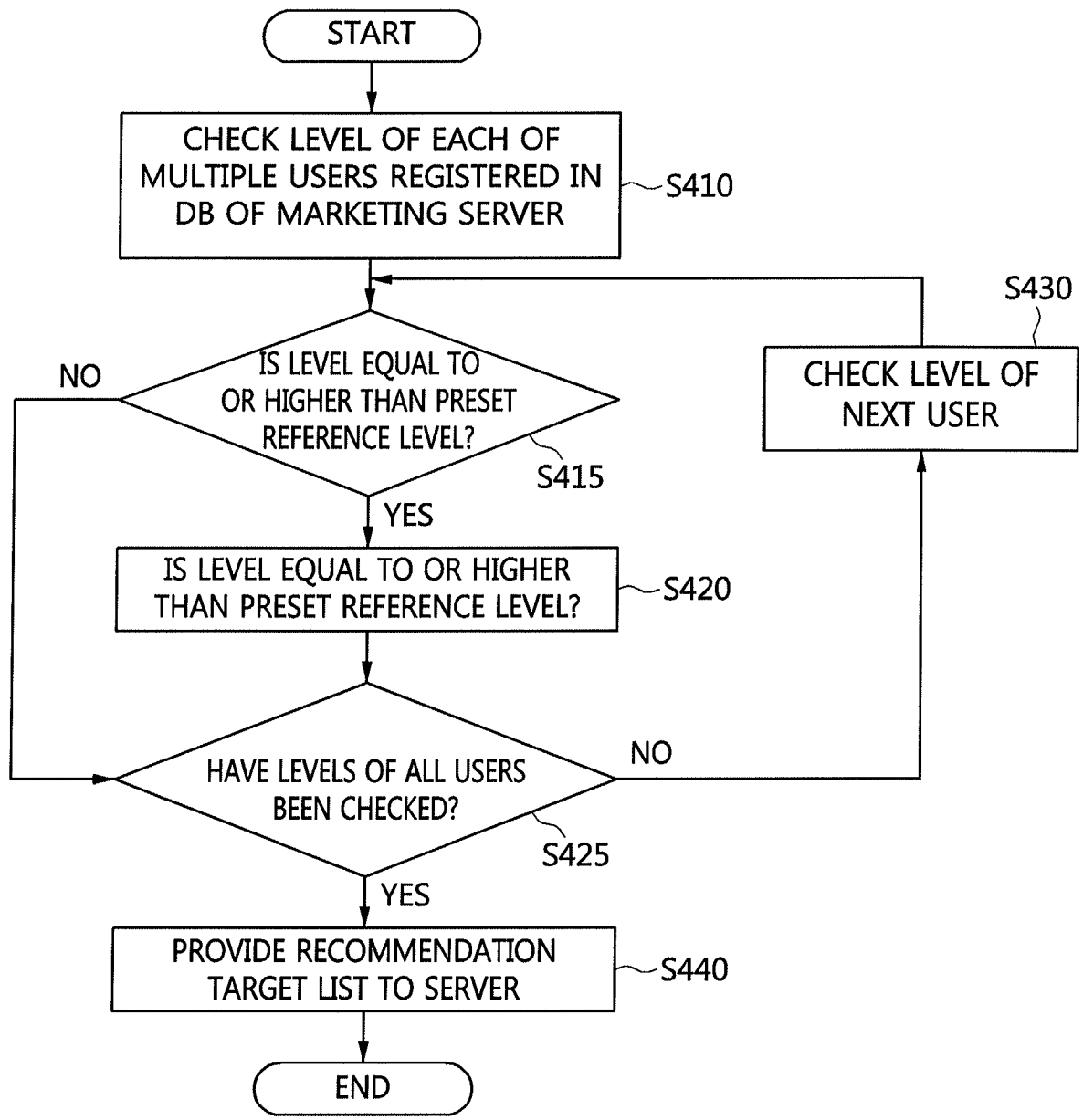
FIG. 4 is a flowchart that shows an example of the process of creating a recommendation target list in the method for providing a personalized recommendation service according to the present invention.

FIG. 4 is a flowchart that shows an example of the process of creating a recommendation target list in the method for providing a personalized recommendation service according to the present invention.

Referring to FIG. 4, in the process of creating a recommendation target list in the method for providing a personalized recommendation service according to the present invention, first, level information corresponding to each of multiple users registered in the database of a marketing server may be checked at step S410.

Here, the level may be set for each user based on at least one of the behavior of buying items on the marketing server and the rate of reading emails. That is, a user who actively buys items on the marketing server or a user who often reads marketing emails based on a personalized recommendation service may have a high level.

Then, whether the level of the user is equal to or higher than a preset reference level is determined at step S415, and when it is determined that the level of the user is equal to or higher than the preset reference level, the corresponding user may be included in the recommendation target list at step S420.

For example, it may be assumed that the users registered in the marketing server are classified into five levels from first to fifth levels, and that users who have made more purchases or who use the service more frequently are classified as preferred customers, corresponding to the first level. Here, if the personalized recommendation service is provided only to users corresponding to the first level or the second level, the users whose level is the first level or the second level, among all of the users registered in the marketing server, are retrieved, whereby a recommendation target list including the retrieved users may be created.

Then, whether the level is checked for all of the users may be determined at step S425.

Also, even when it is determined at step S415 that the level of the user is lower than the preset reference level, whether the level is checked for all of the users may be determined at step S425.

When it is determined at step S425 that there is a user whose level is not checked, the level information of the next user may be checked at step S430.

Also, when it is determined at step S425 that the level is checked for all of the users, the complete recommendation target list may be provided to the server for providing the personalized recommendation service at step S440.

Figure 5:
FIG. 5 is a view that shows an example of a marketing email created based on recommendation of a merchandiser (MD)

FIG. 5 is a view that shows an example of a marketing email based on the recommendation of a merchandiser (MD).

Figure 6:
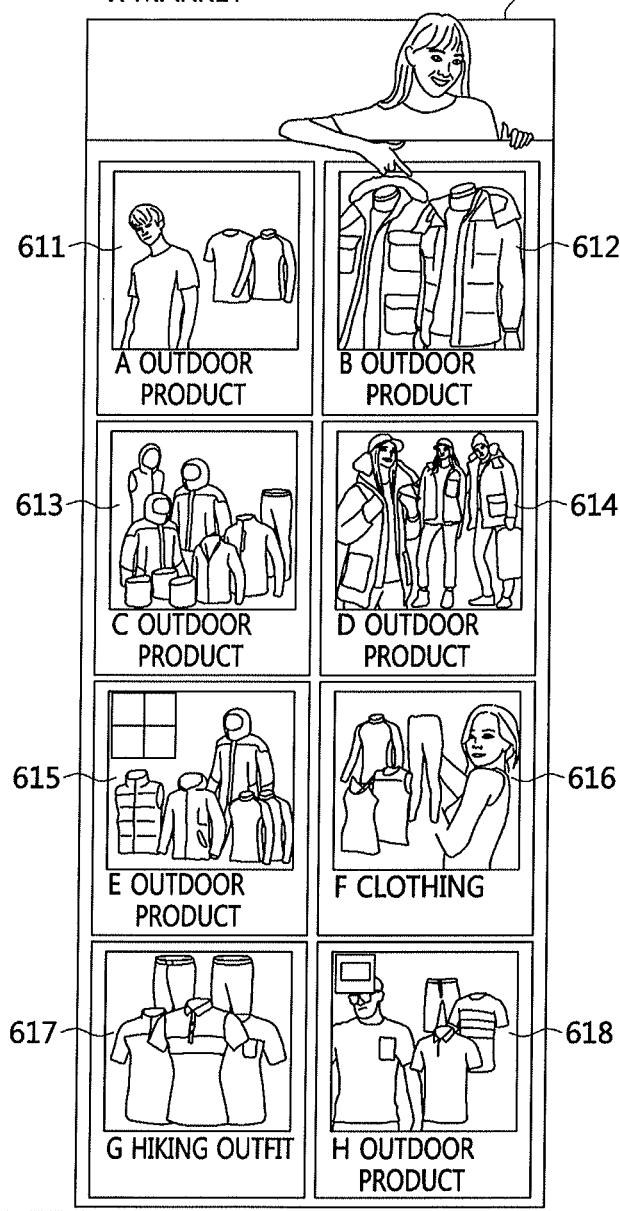
FIG. 6 is a view that shows an example of a personalized recommendation email created through the method for providing a personalized recommendation service according to the present invention.

FIG. 6 is a view that shows an example of a personalized recommendation email created through the method for providing a personalized recommendation service according to the present invention.

Referring to FIG. 5 and FIG. 6, because the email 600 based on the personalized recommendation service according to an embodiment of the present invention has the same look & feel as the marketing email 500 based on the recommendation of the MD, the user who received the email may not feel alienated.

However, the email 600 based on the personalized recommendation service according to an embodiment of the present invention makes a personalized recommendation based on the user's behavior on the marketing site or in the online shopping mall, whereby personalized recommended items 611 to 618, restricted to items in which the user is likely to be interested, may be recommended.

For example, the template of the email 500 shown in FIG. 5 contains the items 511 to 518 recommended by the MD, which are desk A 511, shoes B 512, clothing C 513, clothing D 514, sneakers E 515, food F 516, electronic device G 517, and electronic device H 518, but these items 511 to 518 are not related to each other. That is, these items are not regarded as items to which the user's preference or shopping pattern is reflected, and simply include best-selling items or discounted items.

However, the personalized recommended items 611 to 618 included in the email 600 shown in FIG. 6 are products related to outdoor activities and clothes related thereto, and it may be determined that a user's personal preference or purchase pattern is reflected thereto.

If the email 500 shown in FIG. 5 is sent to a user who is interested in or wants to buy items related to outdoor activities, the user may not acquire information about the desired item from the email 500. Also, if such emails are continuously sent to the user, the user may opt not to continue to receive the marketing emails, and it may hurt the image of the corresponding marketing site or shopping mall, which may lead to a decrease in the rate of use of the marketing site or shopping mall.

Accordingly, in order to prevent such a problem and make a positive effect, the present invention provides recommendations personalized for each user, thereby reducing inconvenience in which users are forced to view unwanted items and improving a click-through rate and conversion rate for an item provided by a marketing site.

Figure 7:
FIG. 7 is a view that shows an example of dynamic content according to the present invention.

FIG. 7 is a view that shows an example of dynamic content according to the present invention.

Referring to FIG. 7, dynamic content according to the present invention may be information displayed in the template 700 corresponding to the personalized recommendation service.

That is, information about the personalized recommended item shown to the recommendation target user who is reading an email may be the dynamic content.

Here, the dynamic content may be a combination of the dynamic image 710, which is created by converting item information about a personalized recommended item so as to match the item image only for the marketing use, and the dynamic image 720, which is created by converting the text included in the item information into an image.

Here, the dynamic images 710 and 720 may be created so as to match the format of the template.

Here, when the personalized recommendation service is provided using HTML tags, as in the present invention, it is difficult to provide text as dynamic information. Therefore, item information stored in a text format, such as an item name, a price, and the like, may be converted into an image, whereby such item information may be provided as a dynamic image.

Here, the dynamic content, as the word itself means, is not static content but dynamic data received from an API server, which operates in conjunction with a marketing server or a server for providing a personalized recommendation service, based on API calls.

Figure 8:
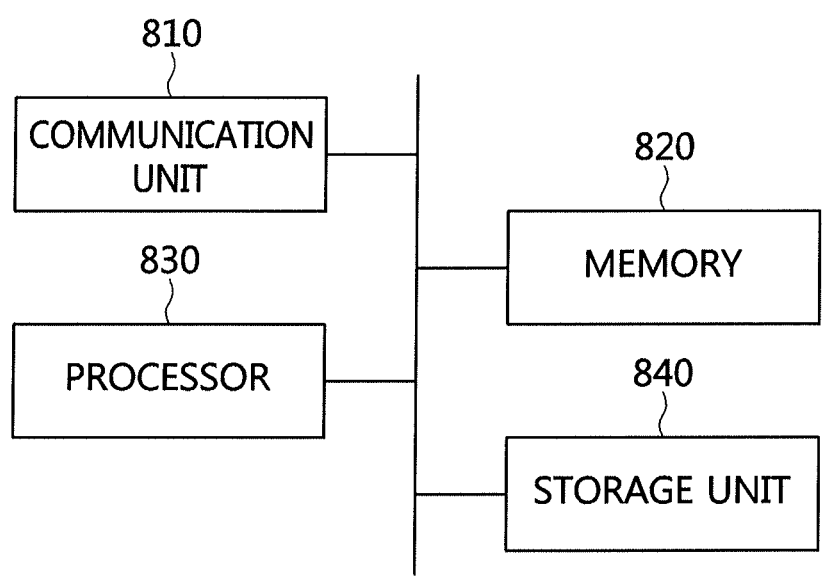
FIG. 8 is a block diagram that shows a server for providing a personalized recommendation service according to an embodiment of the present invention.

FIG. 8 is a block diagram that shows a server for providing a personalized recommendation service according to an embodiment of the present invention.

Referring to FIG. 8, the server for providing a personalized recommendation service according to an embodiment of the present invention includes a communication unit 810, memory 820, a processor 830, and a storage unit 840.

The communication unit 810 functions to send and receive information that is necessary in order to provide a personalized recommendation service through a communication network.

The memory 820 determines a personalized recommended item targeted at a recommendation target user and stores dynamic image output code that is created for outputting the personalized recommended item.

Here, the personalized recommended item targeted at the recommendation target user is an item that is recommended in consideration of the shopping or purchase pattern of the recommendation target user or the pattern of use of a marketing site, and may be an item that is more likely to be bought than general items. Recently, items have come to be recommended to individual users through marketing based on personalized recommendations, whereby the volume of transactions in the online shopping markets continues to increase.

Accordingly, the present invention also provides a recommendation target user with recommended items based on such personalized recommendation, but may create dynamic image output code in order to output information about the personalized recommended item through a marketing email.

Here, the dynamic image output code may be code for outputting a dynamic image for the personalized recommended item targeted at the recommendation target user. For example, using the dynamic image output code, various kinds of information, such as an image of the personalized recommended item, the name thereof, the price thereof, discount information, options, and the like, may be configured in the form of a dynamic image and output to an email.

Generally, in order to display dynamic content on the web, a language such as JavaScript, HTML5, or the like must be used. However, because JavaScript is vulnerable to security issues, there is concern about propagation of malware, such as computer viruses or ransomware. Therefore, most email hosting providers ban the use of JavaScript in email content. Also, HTML5 is a next-generation web standard language, which may display dynamic content without installation of a special plugin or application, but still has features that are not fully compatible with all browsers, so it is not adequate to display email content.

Accordingly, existing email marketing systems send emails containing static information. In this case, when item information is changed due to the circumstances of the seller or a marketing site, a new email corresponding to the changed information must be sent again, which is inconvenient. However, in order to sell more items in the online shopping market, item information may frequently be changed by sellers. Accordingly, it is difficult to always provide the most recent information to users who receive the email.

Also, because the number of items that can be displayed in a marketing email is limited, the period during which the item information included in the market email is maintained is set under the agreement between a shopping mall manager and an item seller. Accordingly, even if information about the actual item is changed during the set period, changing the item information included in the marketing email is not allowed for user convenience.

However, in the case of email marketing using a personalized recommendation service according to the present invention, because any item matching user's behavior patterns and preferences may be recommended by being displayed in an email, all items registered in a marketing site or an online shopping mall may be selected as items to be recommended. For example, "11st", which is the biggest online open market in Korea, has more than eighty million items registered therein, and it is virtually impossible to maintain item information displayed in an email.

Therefore, in order to dynamically display the most recent item information in an email, the present invention uses HTML tags and dynamic image output code based on an API for providing imaged item information.

The dynamic image output code will be described in detail when the processor 830 is described.

The processor 830 creates an email for providing a personalized recommendation service based on the dynamic image output code, sends the email to a recommendation target user, and provides the personalized recommendation service by calling the most recent item information corresponding to the personalized recommended item from the marketing server based on the execution of the dynamic image output code when the recommendation target user reads the email.

First, the processor 830 creates an email for providing a personalized recommendation service based on the dynamic image output code and sends the email to the recommendation target user.

Here, an email may be created by applying the dynamic image output code to the template of the email, which is the template of the personalized recommendation service that enables personalized recommended items to be arranged in the same layout.

Here, the email may be sent based on the server according to an embodiment of the present invention or using a separate email-sending server.

Also, the processor 830 provides the personalized recommendation service by calling the most recent item information corresponding to the personalized recommended item from the marketing server based on the execution of the dynamic image output code when the recommendation target user reads the email.

Here, the dynamic image output code is contained in the <img> tag, among HTML tags, and may include a trigger for calling an API for creating a dynamic image for the personalized recommended item based on the item code of the personalized recommended item.

Generally, in order to display an image on the web, the HTML <img> tag is used. Here, the image path written in the <img> tag is mostly a static file path, in which case it is problematic in that dynamic content may not be represented with the <img> tag. Accordingly, the present invention includes a trigger for calling an API in the image path, whereby the dynamic image related to the personalized recommended item may be output.

Here, the trigger for calling an API may be the URL of the API for outputting dynamic information about the personalized recommended item. That is, the HTML <img> tag is used to represent information about an item in the email, but the URL of the API is used as the URL of the image source, instead of a static image file path, whereby the dynamic image may be displayed using the API.

For example, the code for calling a dynamic image item may be created as follows:

```
<a href="item_detail_page_URL">
<img src =
"http://www.11st.co.kr/commons/ProductApiAction.tmall?method=getProductImage&prod
uctCode=1116201797"></br>
<img src =
"http://www.11st.co.kr/commons/ProductApiAction.tmall?method=getProductNameNCost
&productCode=1116201797">
</a>
```

In the above code, the image source (src) written in the <img> tag is not a static file path, but a method of calling an API having the item code (1116201797) as the argument thereof. That is, according to the above <img> tag, the dynamic image corresponding to the item code may be requested and acquired from an API server based on the URL included in the <img src=""> tag.

Here, the API server may be a server for transmitting a dynamic image corresponding to the personalized recommended item according to an embodiment of the present invention.

Here, based on the operation of the API-calling trigger, item information about the item mapped to the item code, among multiple items registered in the marketing server, may be acquired.

For example, when the dynamic image for the item code is requested from the API server through the operation of the API-calling trigger, the server according to an embodiment of the present invention, which operates in conjunction with the API server, may acquire item information about the personalized recommended item mapped to the item code. Therefore, the API server may operate in conjunction with the server according to an embodiment of the present invention.

Here, the item information is converted into the format of a template corresponding to the personalized recommendation service, that is, the template displayed in an email, whereby a dynamic image may be created.

Here, using the item information, an item image only for the use of email marketing and text information about the personalized recommended item are combined and converted into an image, whereby a dynamic image may be created.

Here, when the personalized recommendation service is provided using HTML tags, as in the present invention, it is difficult for text to be provided as dynamic information. Therefore, item information stored in a text format, such as an item name, a price, and the like, is converted into an image, whereby such information may be provided as a dynamic image.

Also, a dynamic image may be created in advance before the dynamic image output code is executed. That is, when a personalized recommended item is targeted at the recommendation target user, a dynamic image is created and mapped to the item code thereof. Then, the created dynamic image may be provided when the dynamic image is requested through the execution of the dynamic image output code.

Here, a dynamic image may be created in advance before it is provided. That is, considering the performance of the system for providing a personalized recommendation service, a dynamic image for an item is created when the item is newly registered in an item DB or when the item is updated in order to prevent loading latency when a recommendation target user reads an email.

Here, dynamic content for the personalized recommendation service is created by applying the dynamic image to the template of the personalized recommendation service, that is, the template output via the email, and then the dynamic content may be shown to the recommendation target user using the email.

Here, the dynamic content, in which the dynamic image is applied to the template, may be the content that is finally shown to the recommendation target user. That is, the dynamic content may be recommendation information created by incorporating the most recent information about the personalized recommended item therein based on the dynamic image.

Also, the processor 830 may acquire a recommendation target list to be provided with the personalized recommendation service based on the database of the marketing server.

Here, email marketing using the personalized recommendation service according to an embodiment of the present invention may be managed for each campaign. Accordingly, recommendation target users to be provided with the personalized recommendation service may be extracted depending on a certain campaign.

Here, the recommendation target users may be selected from users registered in the marketing server that provides the personalized recommendation service. Therefore, the recommendation target list may be created based on user information or member information stored in the database of the marketing server.

Here, the recommendation target list may include a user whose level, which is set based on at least one of the behavior of buying items on the marketing server and the rate of reading emails, is equal to or higher than a preset reference level, among the multiple users registered in the database of the marketing server. That is, users who actively buy items on the marketing server or users who often read marketing emails based on a personalized recommendation service may be included in the recommendation target list.

For example, it may be assumed that the users registered in the marketing server are classified into five levels from first to fifth levels, and that users who have made more purchases or who use the service more frequently are classified as preferred customers, corresponding to the first level. Here, if the personalized recommendation service is provided only to users corresponding to the first level or to the second level, users whose level is the first level or the second level, among all of the users registered in the marketing server, are retrieved, whereby a recommendation target list including the retrieved users may be created.

Here, the recommendation target list is created in the marketing server and then provided to the server according to an embodiment of the present invention, or may be created in the server that received user information from the marketing server.

Here, dynamic image output code is created for each of the multiple recommendation target users included in the recommendation target list, whereby the personalized recommendation service may be provided.

Here, the emails to be sent to the multiple recommendation target users may be based on the same template, but information about a personalized recommended item included in the template may differ depending on the user.

Also, the processor 830 may extract multiple personalized recommended items for the recommendation target user in consideration of the preset number of items to be exposed in the template of the personalized recommendation service.

Here, the multiple personalized recommended items may be extracted for each user in consideration of the shopping pattern, the purchase pattern, the personal preference, and the like of the recommendation target user, and may be extracted based on the items that are registered in the marketing server and stored in the database.

Here, the preset number of items to be exposed may be the number of personalized recommended items that can be included in the template of the personalized recommendation service. That is, the preset number of items to be exposed is the number of items to be shown to the recommendation target user through the email.

Here, the number of items to be exposed may be set and changed by the personalized recommendation service provider according to an embodiment of the present invention, but may be set so as to correspond to the number of items that can be contained in the template.

Here, in preparation for the case where the personalized recommended items are out of stock, a greater number of personalized recommended items than the preset number of items to be exposed may be extracted.

For example, it may be assumed that ten personalized recommended items are extracted because the preset number of items to be exposed is ten, and that the personalized recommendation service is provided based on the extracted items. Here, if any of the ten personalized recommended items is out of stock, another personalized recommended item must replace the out-of-stock item. Therefore, a number of personalized recommended items that is two or three items greater than the preset number of items to be exposed are extracted, and when it is necessary to replace an item with another one, one of the remaining personalized recommended items replaces the item, whereby the personalized recommendation service may be provided.

Here, the item code of each of the multiple personalized recommended items may be matched with the user id of the recommendation target user.

Here, the user id of the recommendation target user may be acquired based on the user information stored in the database of the marketing server.

Also, when item information registered in the database of the marketing server is changed, the processor 830 may update a dynamic image for the personalized recommendation service based thereon.

For example, it may be assumed that item information about item A registered in the database of the marketing server is changed. Here, if there is a recommendation target user whose personalized recommended item is the item A, the most recent information about the item A must be provided as the personalized recommendation service. Accordingly, a dynamic image is created by combining and converting the item information about the item A, and the created dynamic image may be mapped to the item code of the item A.

In another example, it may be assumed that a new item B is registered in the database of the marketing server. Here, because the item B may be provided as a personalized recommended item to the recommendation target user whose personalized recommended items are similar to the item B, a dynamic image for the item B is created, and the dynamic image may be mapped to the item code of the item B in advance.

Also, when a user clicks on the personalized recommended item shown in the email, the processor 830 may provide a detail page about the personalized recommended item in order to increase sales of the corresponding item.

Also, the processor 830 may send a general marketing email to general users who are not included in the recommendation target list.

Here, the general marketing email uses the same template as the email of the personalized recommendation service according to an embodiment of the present invention, but may be configured by applying a general recommended item to the template, rather than applying a personalized recommended item.

The storage unit 840 may support a function for providing a personalized recommendation service according to an embodiment of the present invention, as described above. Here, the storage unit 840 may operate as separate mass storage, and may include control functions for performing operations.

Meanwhile, the server may store information in memory installed therein. In an embodiment, the memory is a computer-readable recording medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard disk device, an optical disk device, or any other kind of mass storage.

Through the above-described server for providing a personalized recommendation service, a recommendation service personalized for each user is provided using email marketing, whereby a click-through rate or conversion rate related to the personalized recommendation service may be increased.

Also, when a user reads an email, the most recent information about the item that is being provided in the marketing server may be provided.

Also, a personalized recommendation email is automatically created and sent, whereby the efficiency and convenience of email marketing may be improved.

Figure 9:
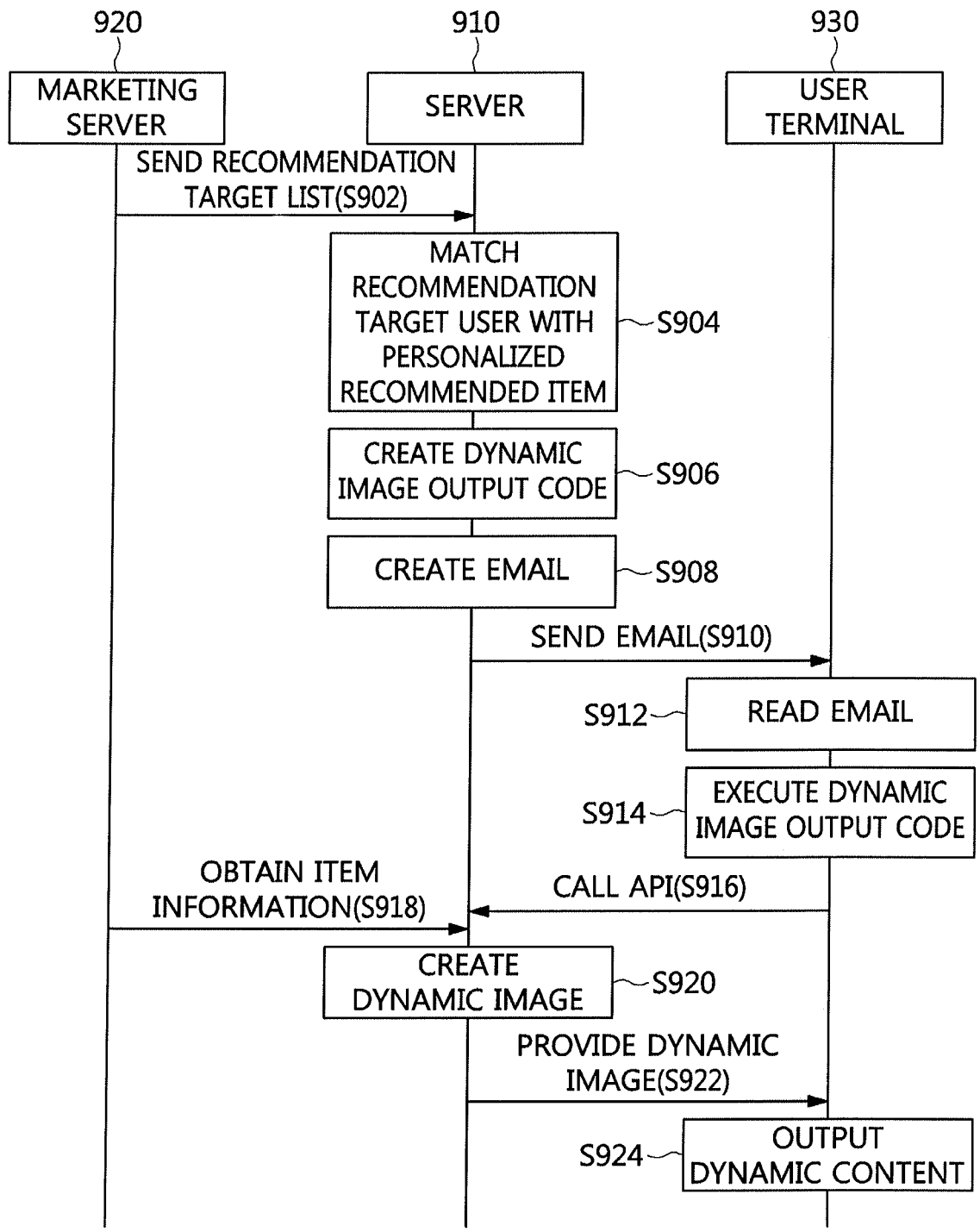
FIG. 9 is a view that shows the process of providing a personalized recommendation service according to an embodiment of the present invention.

FIG. 9 is a view that shows the process of providing a personalized recommendation service according to an embodiment of the present invention.

Referring to FIG. 9, in the process of providing a personalized recommendation service according to an embodiment of the present invention, first, a marketing server 920 may create a recommendation target list to which a personalized recommendation service is to be provided and transmit the recommendation target list to a server 910 at step S902.

Then, the server 910 may match a recommendation target user with a personalized recommended item based on the recommendation target list at step S904.

Here, a personalized recommended item is extracted for each user, and the item code of the extracted personalized recommended item may be matched with the user id of the user.

Then, the server 910 may create dynamic image output code at step S906, and may create an email for providing the personalized recommendation service based on the dynamic image output code at step S908.

Here, the dynamic image output code is contained in the <img> tag, among HTML tags, and may include a trigger for calling an API for creating a dynamic image for the personalized recommended item based on the item code of the personalized recommended item.

Then, the server 910 may send the email to a user terminal 930 at step S910.

Then, when the email is read on the user terminal 930 at step S912, the dynamic image output code included in the email is executed at step S914, and the API may be called in the server 910 at step S916.

Here, the API-calling trigger included in the dynamic image output code is the URL of the API for outputting a dynamic image of the personalized recommended item, and the dynamic image may be requested from the API server using the API.

Then, the server 910 acquires item information corresponding to the personalized recommended item from the marketing server 920 at step S918 based on the item code, which is the argument of the API, creates a dynamic image at step S920 based on the acquired item information, and provides the dynamic image to the user terminal 930 at step S922.

Here, the item information is converted into the format of the template corresponding to the personalized recommendation service, that is, the template output via the email, whereby a dynamic image may be created.

Here, using the item information, an item image only for the use of email marketing and text information about the personalized recommended item are combined and converted into an image, whereby a dynamic image may be created.

Here, when the personalized recommendation service is provided using HTML tags, as in the present invention, it is difficult for text to be provided as dynamic information. Therefore, item information stored in a text format, such as an item name, a price, and the like, is converted into an image, whereby such information may be provided as a dynamic image.

Then, dynamic content is created by applying the dynamic image to the template, and the created dynamic content may be shown to the user at step S924.

Figure 10:
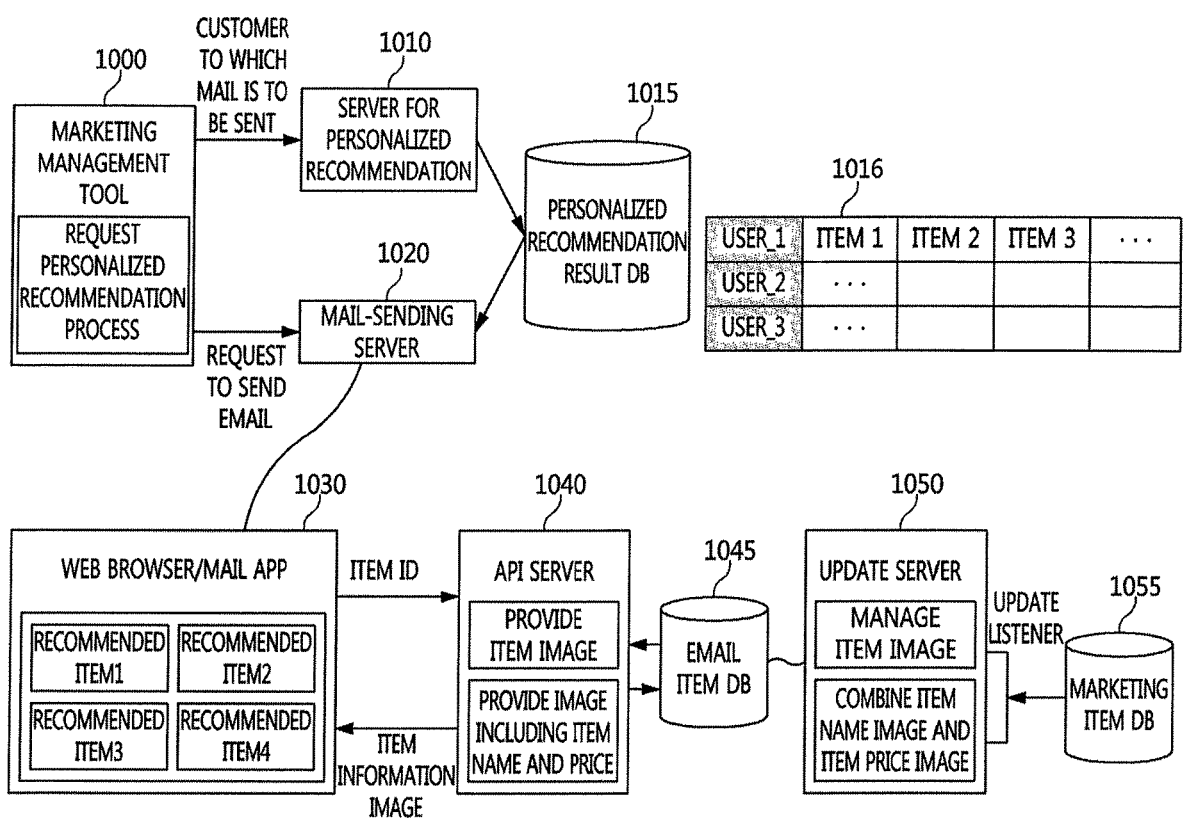
FIG. 10 is a view that shows a system for providing a personalized recommendation service according to another embodiment of the present invention.

FIG. 10 is a view that shows a system for providing a personalized recommendation service according to another embodiment of the present invention.

Referring to FIG. 10, the system for providing a personalized recommendation service according to another embodiment of the present invention includes a marketing management tool 1000, a server 1010 for personalized recommendation, a personalized recommendation result DB 1015, and a mail-sending server 1020. The marketing management tool 1000 manages personalized recommendation email marketing for each campaign and requests a personalized recommendation process. The server 1010 for personalized recommendation recommends an item personalized for a user by analyzing the behavior logs of the user in a shopping mall or a shopping site. The personalized recommendation result DB 1015 stores items recommended for each user and provides the personalized recommended item when an email is sent. The mail-sending server 1020 combines the result of personalized recommendation with a mail template, through which the recommended items may be arranged in the same layout, and sends the mail.

Here, sending an email based on the personalized recommendation service may include three preprocessing processes.

The first process is to form an image from item information by combining an item image for email, the item name, and the item price. This process may be performed when a new item is registered or when item information is changed, and thus an email item DB 1045 may be updated frequently.

The second process is to extract personalized recommended items based on user behavior log data. After the personalized recommended items are extracted, the items recommended for each user are registered in the personalized recommendation result DB 1015.

The third process is to match the personalized recommended items with the template of the email and to send the email in order to send mass e-mail to marketing target users.

The three processes described above may be systematically automated and performed in connection with each other.

Also, in order to dynamically show the most recent information about the recommended item when a user opens the email, a dynamic image for the most recent information is requested from the API server 1040 based on the item ID of the recommended item, whereby the imaged item information may be displayed.

Here, an item name, an item price, and the like are configured in a text format and stored in the marketing item DB 1055. Here, because text cannot be dynamically displayed using only HTML, the item name and the item price may be provided after being converted into images.

Also, the UpdateListener may detect the change of item information, and when it is determined that update is required, the UpdateListener may update the email item DB 1045 using the changed information based on the update server 1050.

The functional operations and implementations of the subject matter described herein may be implemented as digital electronic circuitry, or may be implemented in computer software, firmware, or hardware, including the structures disclosed herein and structural equivalents thereof, or one or more combinations thereof. Implementations of the subject matter described herein may be implemented in one or more computer program products, in other words, one or more modules of computer program instructions encoded on a tangible program storage medium in order to control the operation of a processing system or to be executed by the processing system.

The computer-readable medium may be a machine-readable storage device, a machine-readable storage substrate, a memory device, a composition of material that affects a machine-readable radio-wave-type signal, or one or more combinations thereof.

As used herein, the terms 'system' or 'device' include all kinds of apparatuses, devices and machines for processing data, which include, for example, a programmable processor and a computer, or multiple processors and a computer. In addition to hardware, the processing system may also include, for example, code that configures processor firmware and code that configures an execution environment for computer programs in response to a request from a protocol stack, a database management system, an operating system, or one or more combinations thereof.

A computer program (also known as a program, software, a software application, a script or code) may be written in any form of programming language including a compiled or interpreted language, or an a priori or procedural language, and may be deployed in any form including standalone programs or modules, components, subroutines, or other units suitable for use in a computer environment. The computer program does not necessarily correspond to a file in a file system. The program may be stored in a single file provided to the requested program, in multiple interactive files (for example, files storing one or more modules, subprograms or portions of code), or in a part of a file containing other programs or data (for example, one or more scripts stored in a markup language document). The computer program may be located on a single site, or may be distributed across multiple sites such that it is deployed to run on multiple computers interconnected by a communications network or on a single computer.

The computer-readable medium suitable for storing computer program instructions and data may include, for example, semiconductor memory devices, such as EPROM, EEPROM and flash memory devices, all types of nonvolatile memory, including magnetic disks, such as internal hard disks or external disks, magnetic optical disks, CD-ROMs and DVD-ROMs, media, and memory devices. A processor and memory may be supplemented by special-purpose logic circuits, or may be integrated therewith.

Implementations of the subject matter described herein may be realized on an arithmetic system including, for example, a back-end component such as a data server, a middleware component such as an application server, a front-end component such as a client computer with a web browser or a graphical user interface through which a user may interact with the implementations of the subject matter described herein, or one or more combinations of the back-end component, the middleware component, and the front-end component. The components of the system may be interconnected using any form or medium of digital data communication such as a communication network.

While the present invention includes a number of specific implementation details, they should not be construed as limitations on the scope of the invention or the claimable scope, but should be understood as a description of features that may be specific to particular embodiments of the invention. Similarly, the specific features described herein in the context of individual embodiments may be implemented by being combined in a single embodiment. Alternatively, various features described in the context of a single embodiment may also be implemented in multiple embodiments individually or in any suitable sub-combination. Further, although such features may be described as operating in a particular combination and initially claimed as such, one or more features from the claimed combination may be excluded from the combination in some cases, or the claimed combination may be altered to a sub-combination or variation thereof.

Also, while this specification illustrates operations in the drawings in a particular order, it should not be understood that such operations must be performed in the particular order or the sequential order shown in the drawings in order to obtain the desired result, or that all of the illustrated operations should be performed. In certain cases, multitasking and parallel processing may be advantageous. Also, separation of the various system components of the above-described embodiment should not be understood as requiring such separation in all embodiments, and it should be understood that the program components and systems described above may generally be integrated into a single software product or packaged into multiple software products.

According to the present invention, a personalized recommended item targeted at a recommendation target user is determined, dynamic image output code for outputting the personalized recommended item is created, an email for providing a personalized recommendation service is created based on the dynamic image output code and sent to the recommendation target user, and the most recent item information about the personalized recommended item is called from a marketing server based on the execution of the dynamic image output code when the recommendation target user reads the email, whereby the personalized recommendation service may be provided. Also, according to the present invention, the most recent item information suitable for customers may be provided to the customers, and the profit of a seller may be increased by increasing the transaction volume of an online shopping site.

According to the present invention, a personalized recommendation service for each user is provided through email marketing, whereby a click-through rate or conversion rate related to the personalized recommendation service may be increased.

Also, the present invention may provide the most recent information about an item that is being provided from a marketing server when a user reads an email.

Also, the present invention automatically creates and sends a personalized recommendation email based on a server, thereby improving efficiency and convenience of email marketing.

Also, the present invention may provide automated personalized recommendation marketing through a mass-marketing channel in spite of the large number of policies and technological limitations of the mass-marketing channel Also, the present invention reduces inconvenience in which users are forced to view unwanted items through email marketing and recommends personalized items, thereby increasing a click-through rate and conversion rate for an item provided in a marketing site and maximizing marketing performance.

Also, the present invention may improve users' loyalty to a marketing site or a shopping mall by improving user experience using a personalized recommendation marketing strategy that is differentiated from that of another site.

This specification is not intended to limit the present invention to the specific terms disclosed herein. Therefore, although the present invention has been described in detail with reference to the above examples, those skilled in the art may conceive alternations, modifications, and variations on these examples without departing from the scope of the present invention. The scope of the present invention is defined by the appended claims rather than the description, and it should be construed that all alternations and modifications derived from the meaning and scope of the appended claims and their equivalents are included within the scope of the present invention.

What is claimed is:

1. A method for providing a personalized recommendation service, comprising:
    determining a personalized recommended item targeted to a recommendation target user based on an activity pattern of the recommendation target user or activity of pattern of a web service associated with the personalized recommendation service;
    creating dynamic image output code for dynamically presenting the determined personalized recommended item when called;
    creating an email including the dynamic image output code;
    sending the created email to the recommendation target user; and
    retrieving item information corresponding to the personalized recommended item by a marketing server responsive to receiving a call associated with execution of the dynamic image output code by the recommendation target user accessing the email; and sending the retrieved item information to the recommended target user for presentation on the email responsive to retrieving of the item information.

2. The method of claim 1, wherein the dynamic image output code is contained in an <img> tag, among Hypertext Markup Language (HTML) tags, and includes a trigger for calling an Application Program Interface (API) for creating a dynamic image corresponding to the personalized recommended item based on an item code of the personalized recommended item.

3. The method of claim 2, further comprising:
based on an operation of the trigger for calling the API, acquiring the item information about an item linked with the item code, among multiple items registered in the marketing server; and
creating the dynamic image by converting the item information to a format of a template corresponding to the personalized recommendation service.

4. The method of claim 3, further comprising creating dynamic content corresponding to the personalized recommendation service by applying the dynamic image to the template.

5. The method of claim 1, further comprising:
acquiring a recommendation target list to be provided with the personalized recommendation service based on a database of the marketing server; and
providing the personalized recommendation service by creating the dynamic image output code for each of multiple recommendation target users included in the recommendation target list.

6. The method of claim 5, wherein the recommendation target list includes a user whose level, which is set based on at least one of an activity of buying items on the marketing server and a rate of reading emails, is equal to or higher than a preset reference level, among multiple users registered in the database.

7. The method of claim 3, further comprising:
extracting multiple personalized recommended items for the recommendation target user in consideration of a preset number of items to be exposed in the template; and
matching an item code of each of the multiple personalized recommended items with a user ID of the recommendation target user.

8. The method of claim 7, wherein extracting the multiple personalized recommended items comprises extracting a greater number of personalized recommended items than the preset number of items to be exposed in preparation of the personalized recommended item being out of stock.

9. A server, comprising:
a processor; and
memory storing instructions thereon, the instructions when executed by the processor cause the processor to:
determine a personalized recommended item targeted to a recommendation target user;
creating dynamic image output code for dynamically creating the determined personalized recommended item when called
sending the created email to the recommended target user; and
retrieving item information corresponding to the personalized recommended item by a marketing server responsive to receiving a call associated with execution of the dynamic image output code by the recommendation target user accessing the email; and
sending the retrieved item information to the recommended target user for presentation on the email responsive to retrieving of the item information.

10. The server of claim 9, wherein the dynamic image output code is contained in an <img> tag, among Hypertext Markup Language (HTML) tags, and includes a trigger for calling an Application Program Interface (API) for creating a dynamic image corresponding to the personalized recommended item based on an item code of the personalized recommended item.

* * * * *